(12) United States Patent
Maltas

(10) Patent No.: US 10,482,795 B2
(45) Date of Patent: *Nov. 19, 2019

(54) METHOD FOR MANUFACTURING A LABELING ARTICLE

(71) Applicant: BEDFORD INDUSTRIES, INC., Worthington, MN (US)

(72) Inventor: Jeffrey Scott Maltas, Sibley, IA (US)

(73) Assignee: Bedford Industries, Inc., Worthington, MN (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/707,370

(22) Filed: Sep. 18, 2017

(65) Prior Publication Data

US 2018/0025674 A1    Jan. 25, 2018

Related U.S. Application Data

(63) Continuation of application No. 15/062,680, filed on Mar. 7, 2016, now Pat. No. 9,799,237, which is a continuation of application No. 14/337,701, filed on Jul. 22, 2014, now Pat. No. 9,311,830, which is a continuation of application No. 13/513,314, filed as application No. PCT/US2010/058642 on Dec. 2, 2010, now Pat. No. 8,819,972.

(60) Provisional application No. 61/265,945, filed on Dec. 2, 2009.

(51) Int. Cl.
| | |
|---|---|
| G09F 3/04 | (2006.01) |
| G09F 3/14 | (2006.01) |
| G06F 3/14 | (2006.01) |
| B65C 3/00 | (2006.01) |
| G09F 3/00 | (2006.01) |
| G09F 3/02 | (2006.01) |

(52) U.S. Cl.
CPC .................. *G09F 3/04* (2013.01); *B65C 3/00* (2013.01); *G06F 3/14* (2013.01); *G09F 3/02* (2013.01); *G09F 3/0288* (2013.01); *G09F 3/14* (2013.01); *G09F 2003/0208* (2013.01); *G09F 2003/0226* (2013.01); *G09F 2003/0255* (2013.01); *Y10T 156/1056* (2015.01); *Y10T 156/1082* (2015.01); *Y10T 428/24008* (2015.01); *Y10T 428/24752* (2015.01)

(58) Field of Classification Search
CPC ..... G09F 3/04; G09F 3/14; B32B 7/14; A61F 13/49019
USPC .................. 156/167, 176, 178, 290
See application file for complete search history.

(56) References Cited

U.S. PATENT DOCUMENTS

| | | | | |
|---|---|---|---|---|
| 1,397,079 | A * | 11/1921 | Cohen | G09F 3/18 40/665 |
| 6,036,234 | A * | 3/2000 | Chess | B42D 5/025 283/101 |
| 7,763,135 | B1 * | 7/2010 | Maltas | G09F 3/14 156/70 |
| 8,819,972 | B2 * | 9/2014 | Maltas | G09F 3/14 40/665 |

(Continued)

*Primary Examiner* — Scott W Dodds
(74) *Attorney, Agent, or Firm* — Mai-Tram D. Lauer; Westman, Champlin & Koehler PA

(57) ABSTRACT

A labeling article and a method of use and assembly of the labeling article, where the labeling article comprises a label, an elastic securing band, and a release liner, and where the elastic securing band is configured to be stretched to define a loop between the elastic securing band and the release liner.

20 Claims, 10 Drawing Sheets

(56) References Cited

U.S. PATENT DOCUMENTS

2004/0015146 A1\* 1/2004 Torigoshi .......... A61F 13/15593
604/385.27

\* cited by examiner

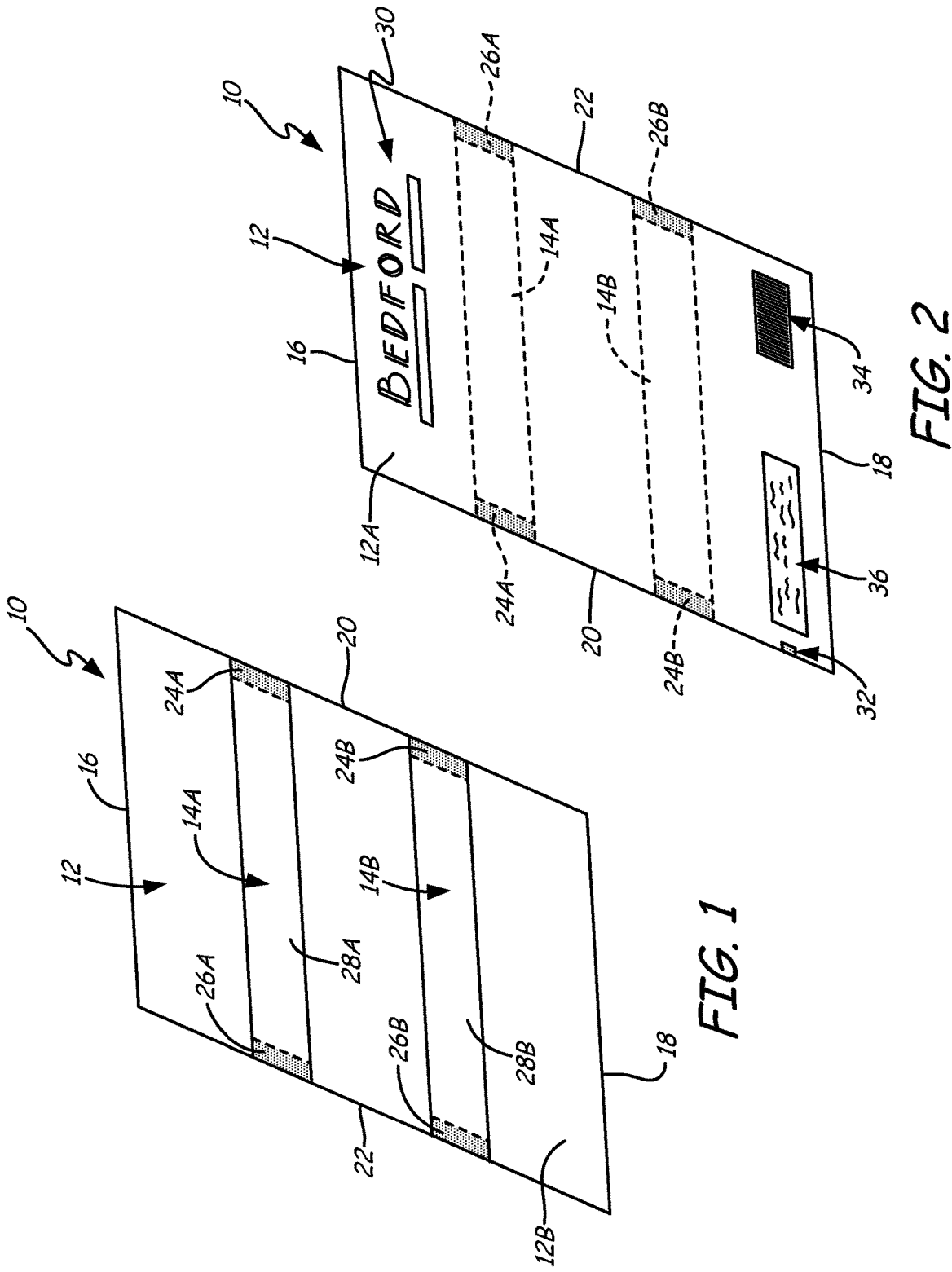

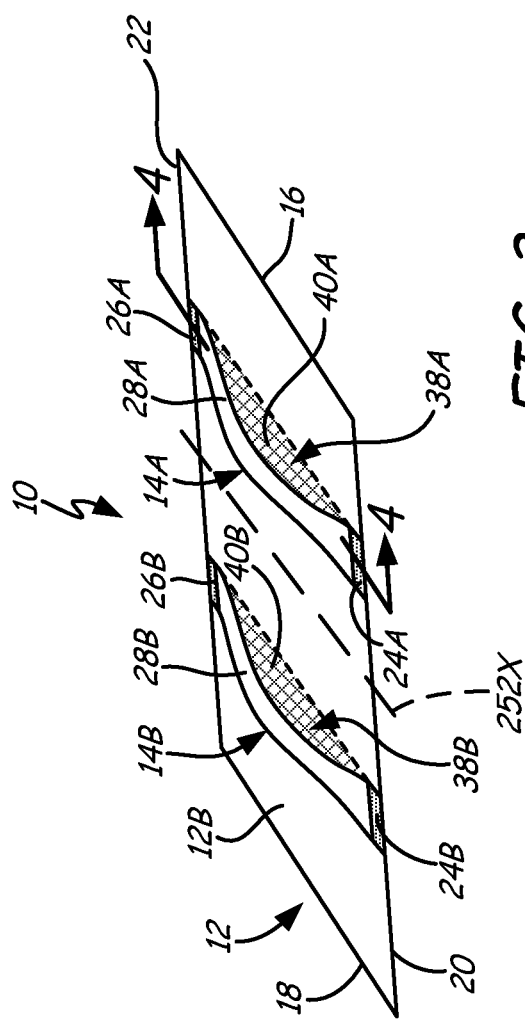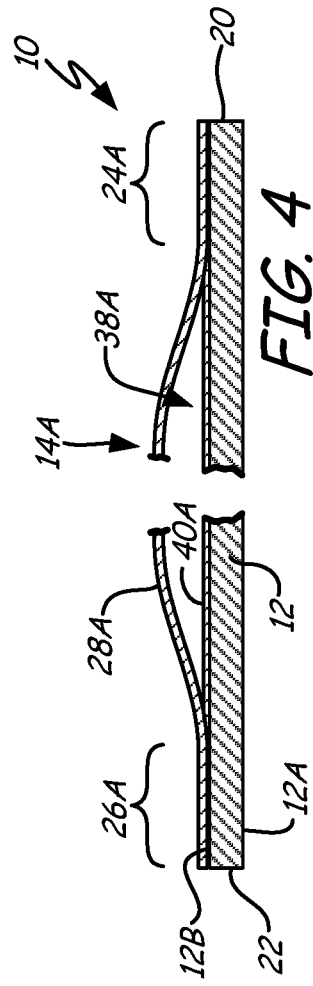

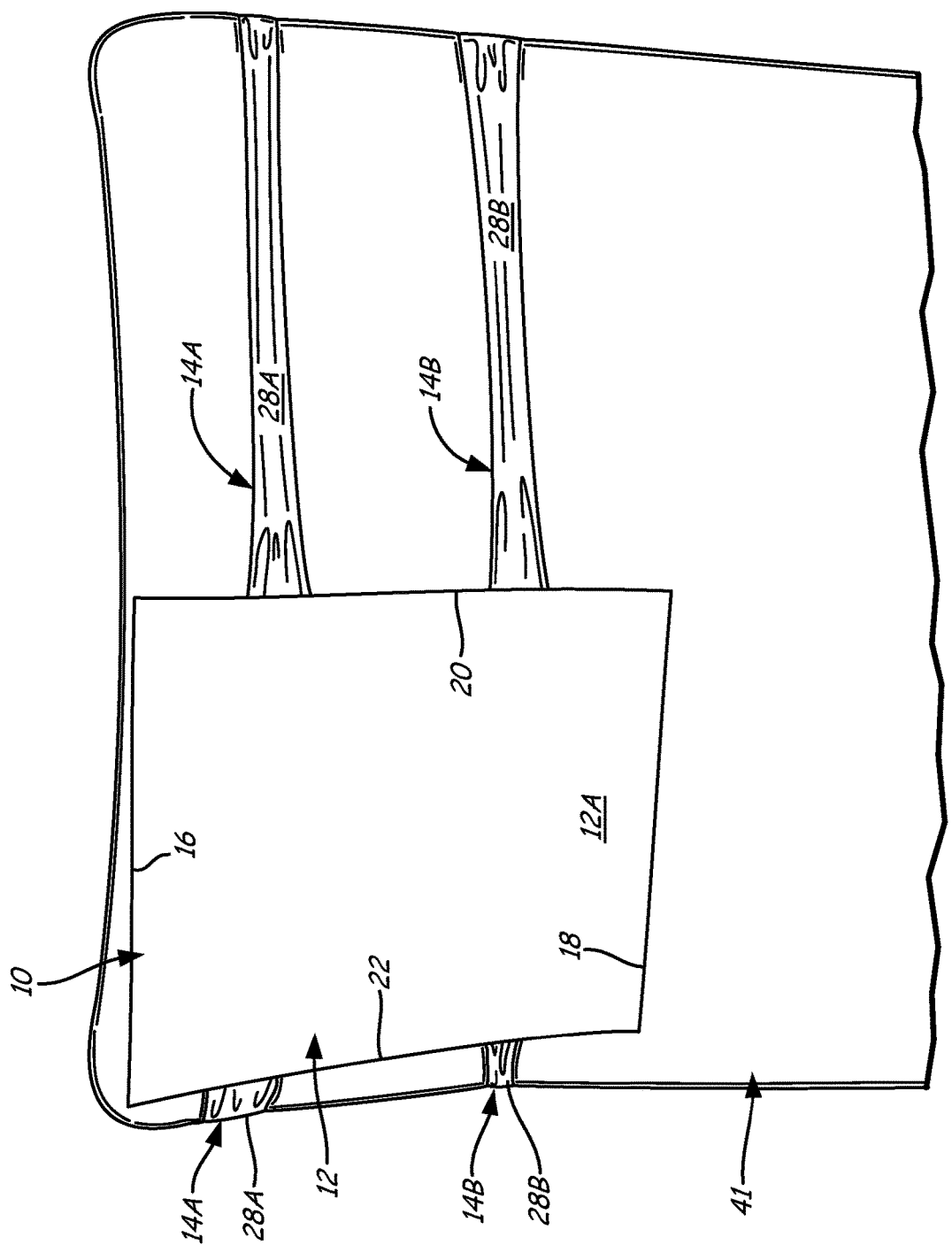

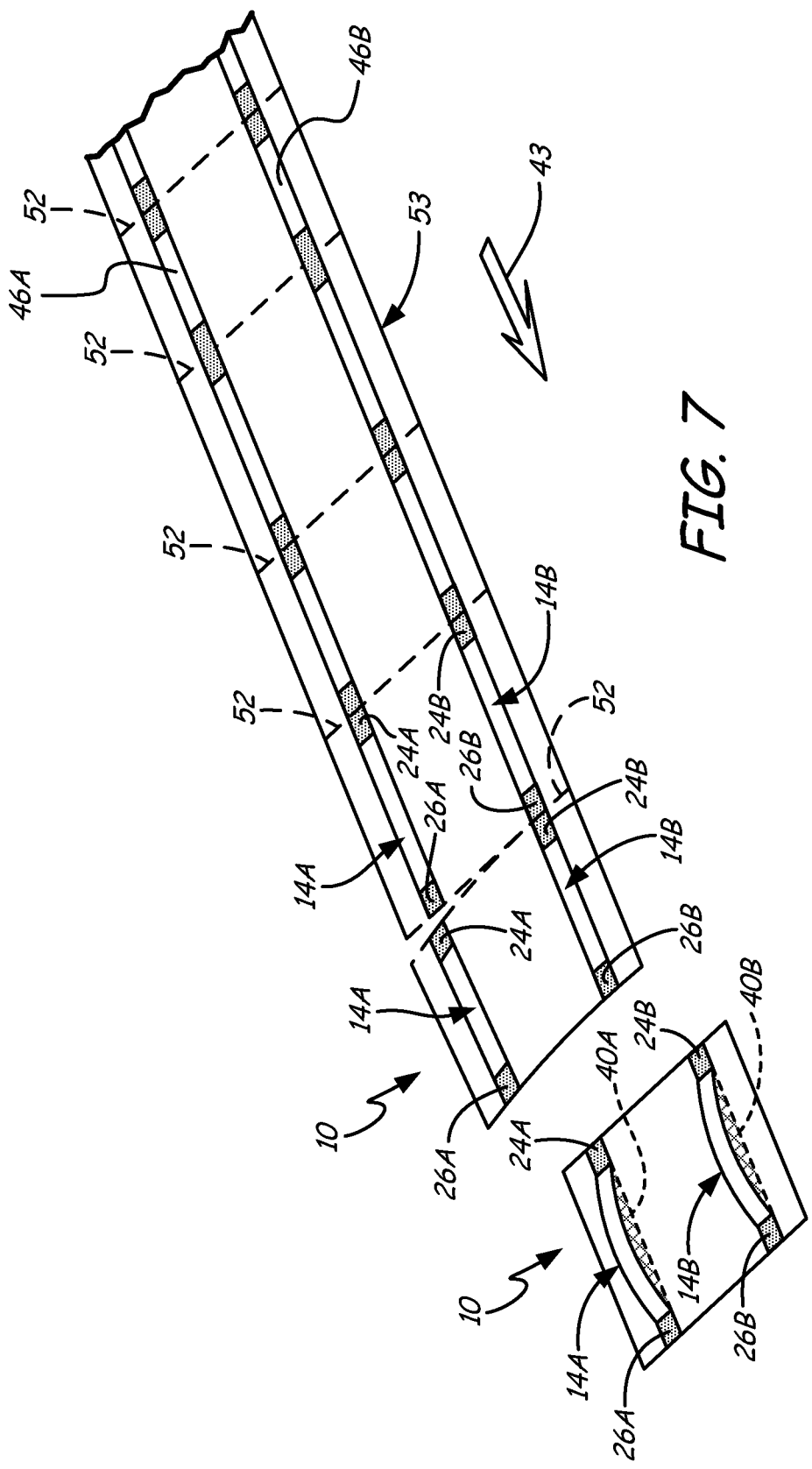

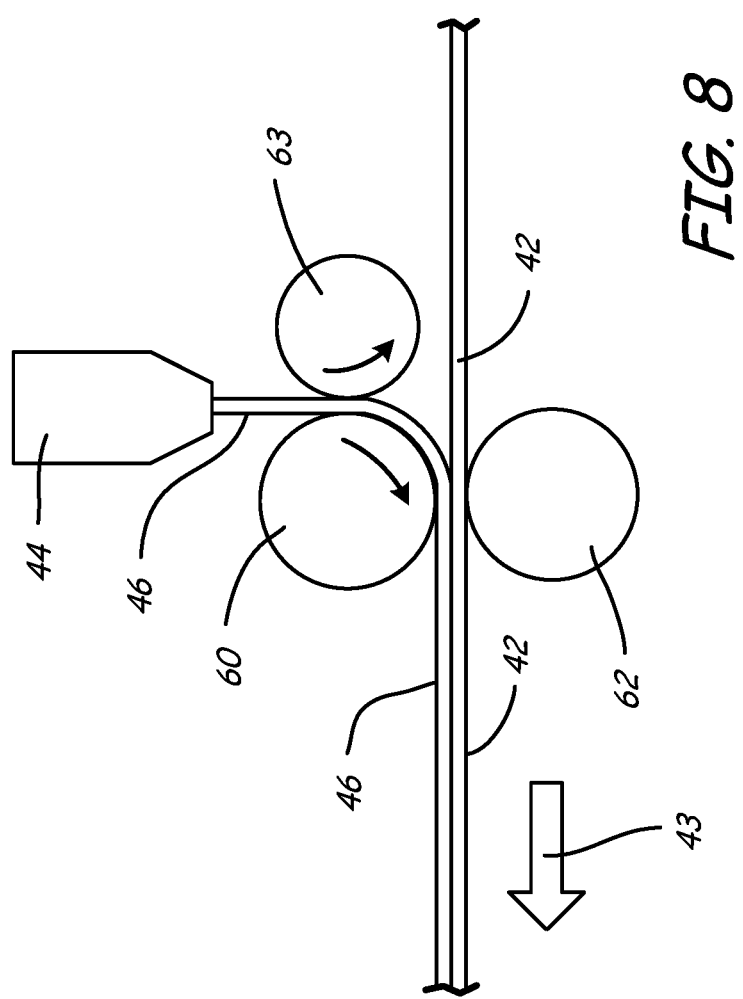

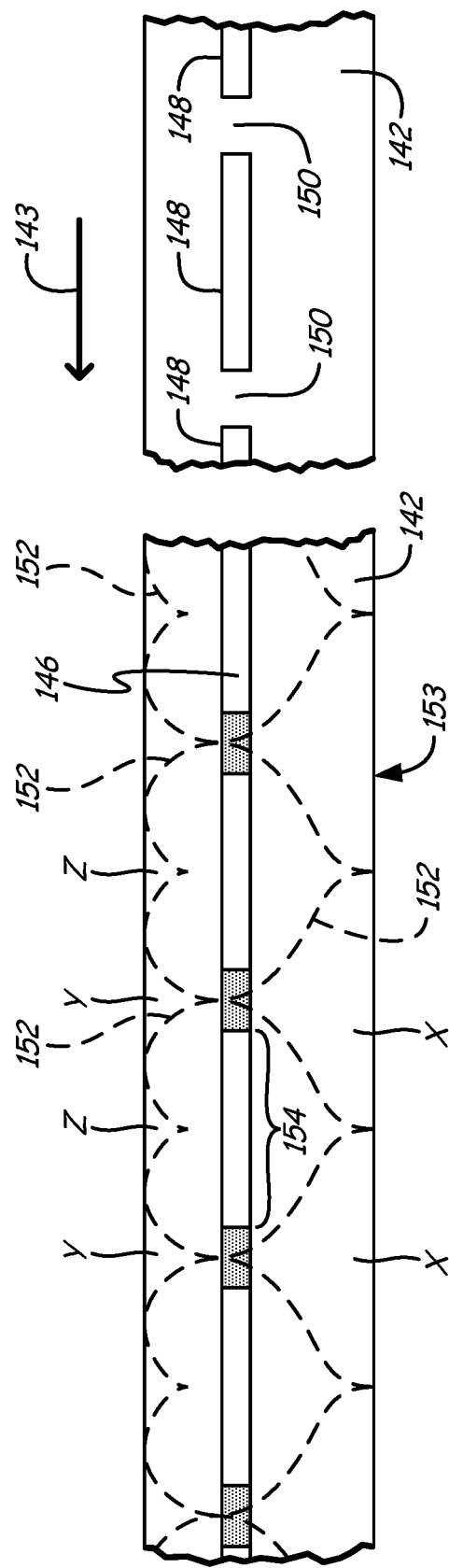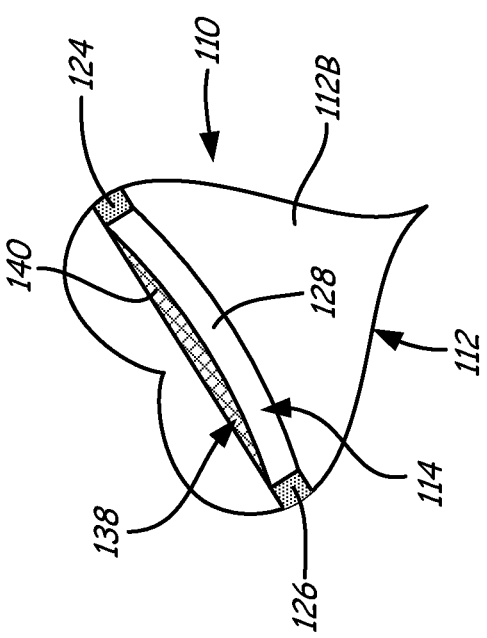
FIG. 10
FIG. 9

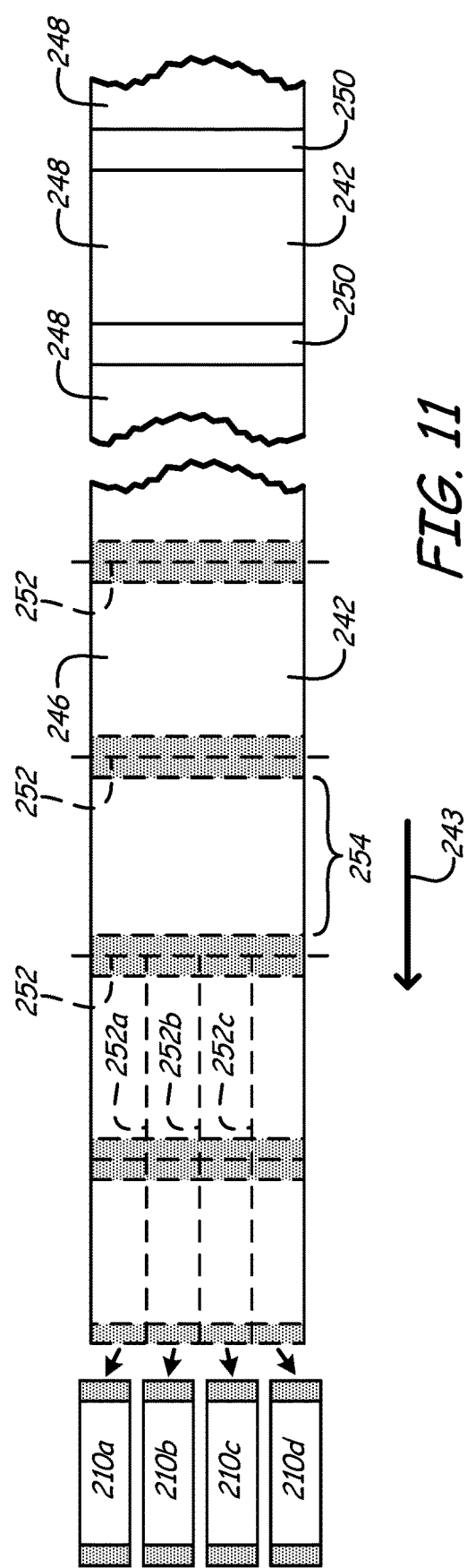

METHOD FOR MANUFACTURING A LABELING ARTICLE

CROSS-REFERENCE TO RELATED APPLICATIONS

This Application is a continuation application of U.S. patent application Ser. No. 15/062,680, filed Mar. 7, 2016; which is a continuation application of U.S. patent application Ser. No. 14/337,701, filed Jul. 22, 2014, now U.S. Pat. No. 9,311,830, which issued on Apr. 12, 2016; which is a continuation application of U.S. patent application Ser. No. 13/513,314, filed Jun. 1, 2012, now U.S. Pat. No. 8,819,972, which issued on Sep. 2, 2014; which is a national phase of International Patent Application No. PCT/US2010/058642, filed on Dec. 2, 2010; which claims the benefit of priority to U.S. Provisional Patent Application No. 61/265,945, filed on Dec. 2, 2009.

BACKGROUND

The present disclosure is directed to labeling articles. In particular, the present disclosure is directed to labeling articles having elastic bands, and methods of manufacturing such labeling articles.

It is known to use an elastic material to affix a label or tag to an item such as a product, its packaging or the like. The label or tag may have an elastic band affixed thereto for securing the label or tag to such an item. The band may be formed at least in part by elastic material that, when stretched, allows the band to be sufficiently large to encompass the item to which it is being attached, without unduly distorting the label or tag, so that it is still readable, either visually by a user or by machine-readable means (e.g., via a bar-code printed on the label or tag). In addition, the label and its elastic fastening component must be strong enough to stand the rigors of transport and handling, and retain itself in position on the article without damage thereto.

SUMMARY

An aspect of the present disclosure is directed to a labeling article that includes a label having a first major surface, a second major surface that opposes the first major surface, a first edge portion, and a second edge portion offset from the first edge portion along a first axis. The labeling article also includes an elastic securing band having a first end bonded to the first major surface at a first bond zone located adjacent to the first edge portion, a second end bonded to the first major surface at a second bond zone located adjacent to the second edge portion, and a span extending along the first axis between the first end and the second end. The labeling article further includes a release liner disposed on the first major surface along the axis between the first bond zone and the second bond zone, where release liner has a surface area that is less than a surface area of the first major surface. The span of the elastic securing band is releasable from the release liner such that the span is configured to be stretched to define a loop between the span and the release liner.

Another aspect of the present disclosure is directed to a method for manufacturing a plurality of labeling articles. The method includes moving a web of a label material in a first direction, and forming skip-coated segments of a release liner material on the moving web along an axis, the formed skip-coated segments being separated by gaps. The method also includes forming a continuous band of an elastic material over the formed skip-coated segments and the gaps, and bonding the band of elastic material to the moving web at the gaps to form bond zones. The method further includes forming lines of separation in a direction that is orthogonal to the first direction such that the formed lines of separation intersect the bond zones.

Another aspect of the present disclosure is directed to a method for manufacturing a plurality of labeling articles, where the method includes moving a web of a label material in a first direction, and forming multiple stripes of skip-coated segments of a release liner material on the moving web, each of the skip-coated segments being separated by gaps. The method also includes forming a continuous band of an elastic material over each formed stripe of the skip-coated segments and the gaps, and bonding the bands of elastic material to the moving web at the gaps to form bond zones for each formed stripe. The method further includes forming lines of separation in a direction that is orthogonal to the first direction such that the formed lines of separation intersect the bond zones.

This Summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

FIG. 1 is a rear perspective view of a labeling article of the present disclosure.

FIG. 2 is front perspective view of the labeling article.

FIG. 3 is a rear perspective view of the labeling article, with its elastomer bands such stretched slightly away from its label.

FIG. 4 is a sectional view as taken along lines 4-4 in FIG. 3.

FIG. 5 is an illustration of the labeling article front side, with the labeling article being affixed to an item (such as the back of a chair).

FIGS. 6 and 7 are schematic illustrations of a web-based process for manufacturing multiple labeling articles of the present disclosure.

FIG. 8 is a side view of one form of an application of molten elastomer to a web of label material using an extruder head and a lamination roll.

FIG. 9 is a rear perspective view of an alternative labeling article of the present disclosure.

FIG. 10 is a schematic illustration of a web-based process for manufacturing multiple alternative labeling articles of FIG. 9.

FIG. 11 is a schematic illustration of a web-based process for manufacturing multiple elastic labeling bands.

Figure 6:
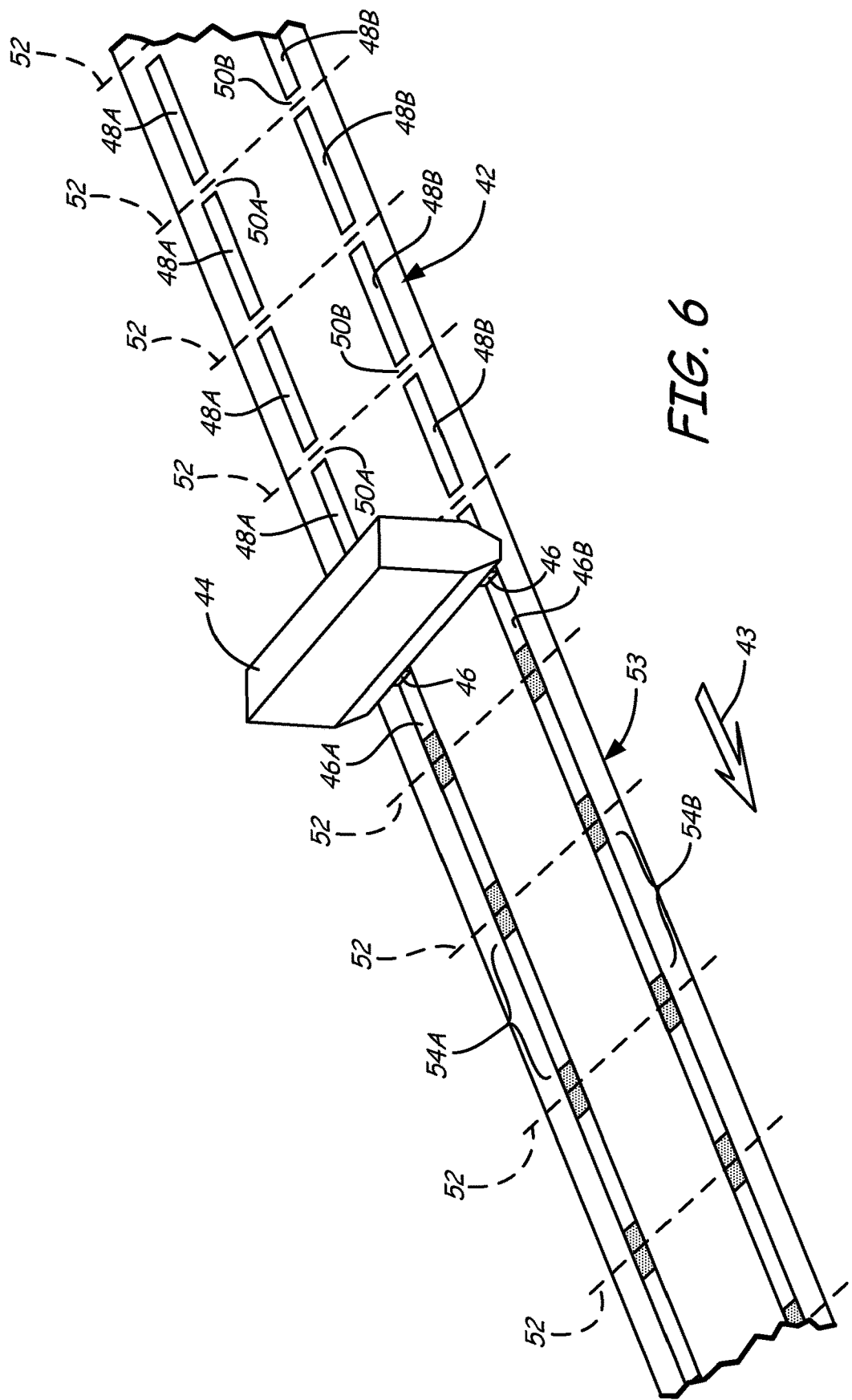

Although the above-identified figures set forth various features of the disclosed subject matter, other combinations of features are also contemplated, as noted in the disclosure. In all cases, this disclosure presents the disclosed subject matter by way of representation and not limitation. It should be understood that numerous other modifications and feature combinations can be devised by those skilled in the art which fall within the scope and spirit of the principles of this disclosure. It should be understood that the figures have not been drawn to scale as it has been necessary to enlarge certain portions for clarity of illustration.

DETAILED DESCRIPTION

The present disclosure is directed to a labeling article that is configured to be attached or bound to one or more items for the presentation of information. As discussed below, the labeling article includes a label or tag portion and one or more flexible securing bands bonded to a back side of the label, where the flexible securing bands may be stretched and secured around an item to retain the label to the item. The label has a surface area that is greater than the surface areas of the one or more flexible securing bands. This allows a front surface of the label to be used to present information, such as information relating to the item to which the labeling article is retained.

FIGS. 1-5 illustrate article 10, which is an example of a suitable labeling article of the present disclosure. As shown in FIG. 1, article 10 includes label or tag portion 12 connected to a pair of flexible securing bands (referred to as bands 14A and 14B). As discussed below, bands 14A and 14B may each be manufactured as a sheet or film of one or more elastomer materials. Label 12 may be sheet-like in formation, with a front side 12A (see, e.g., FIGS. 2, 4, and 5) and an opposite back side 12B (see, e.g., FIGS. 1 and 3). In the shown example, label 12 has a parallelogram geometry. In this instance, label 12 has parallel end edges 16 and 18, and parallel side edges 20 and 22.

Bands 14A and 14B each extend from one side edge to the other of label 12 (i.e., from side edge 20 to side edge 22). Band 14A is bonded to back side 12B of label 12 adjacent to side edges 20 and 22 at bond zones 24A and 26A. In particular, bond zone 24A is located adjacent to side edge 20 and bond zone 26A is located adjacent to side edge 22. A span of band material of band 14A (referred to as span 28A) extends between bond zones 24A and 26A.

Correspondingly, band 14B is bonded to back side 12B of label 12 adjacent to side edges 20 and 22 at bond zones 24B and 26B, where bond zone 24B is located adjacent to side edge 20 and bond zone 26B is located adjacent to side edge 22. A span of band material of band 14B (referred to as span 28B) extends between bond zones 24B and 26B. As discussed below, spans 28A and 28B are each configured to stretch away from label 12 and its respective bond zones for positioning around an item.

Bands 14A and 14B are depicted as being located at the shown locations along back side 12B. However, in alternative embodiments, one or both of bands 14A and 14B may be located at different locations along back side 12B. For example, band 14A may be located at a top end of label 12, adjacent to end edge 16, and band 14B may be located at a bottom end of label 12, adjacent to end edge 18. This arrangement positions bands 14A and 14B at the ends of label 12.

Bands 14A and 14B may each be derived from one or more elastomer materials that are desirably biased toward a non-extended position. Examples of suitable materials for bands 14A and 14B include those recited for the flexible sheets or bands in Maltas et al., U.S. Pat. No. 7,763,135; and for the flexible elastic portions in Ludlow et al., U.S. Pat. No. 7,281,345; and Ludlow et al., International Application Publication No. WO07/084119 elastomer materials). In one embodiment, bands 14A and 14B are each formed at least in part from biodegradable, degradable, or recyclable materials.

In some embodiments, suitable elastomers for bands 14A and 14B include thermoplastic elastomers that are at least heat softenable and even heat meltable to a flowable or moldable state. Examples of suitable thermoplastic elastomers include styrenic block co-polymers (e.g., styrene-butadiene styrene and styrene-ethylene-butylene styrene). Another family of useful thermoplastic elastomers is the olefinic elastomers, including those that are ethylene as well as those that are polypropylene based. Yet another family of thermoplastic elastomers are known as polyvinyl chloride-based elastomers. Still other families of thermoplastic elastomers can be based on urethanes, nylon, silicon, and the like.

FIG. 2 shows article 10 from its front side, such that bands 14A and 14B are not visible through label 12 (when label 12 is formed from an opaque material), and are shown with hidden lines. Label 12 may be derived from one or more paper, polymeric, metallic, organic, and/or fabric materials. Suitable materials for label 12 include those recited for the tag portions in Maltas et al., U.S. Pat. No. 7,763,135; Ludlow et al., U.S. Pat. No. 7,281,345; and Ludlow et al., International Application Publication No. WO07/084119. For example, label 12 may be derived from one or more printable card materials, such as materials commercially available under the trade designation "TESLIN" from PPG Industries, Pittsburgh, Pa. Alternatively, label 12 may be derived from one or more materials such as polypropylene-based materials, styrene-based materials, and combinations thereof. In one embodiment, label 12 is formed at least in part from biodegradable, degradable, or recyclable materials. Label 12 may also be opaque (as noted above), translucent, or transparent.

As further shown in FIG. 2, indicia is disposed on the front side 12A of label 12, in the form of human or machine readable indicia 30, 32, 34, and/or 36. Such indicia may be printed on front side 12A of label 12, such as product source identifying information indicia 30, printing/cutting/processing registration mark 32, or bar code or other optical machine readable information such as indicia 34. In addition, other indicia specific to label 12 may be applied thereto such as indicia 36, which may be embedded in label 12, affixed thereto or formed thereon (e.g., Braille characters). Such information may take the form of an RFID inlay, tag, label or card, or a "smart label", such as one that monitors lapsed time, or bioactive paper or other material useful for destroying, deactivating and/or detecting undesirable pathogens.

In addition, label 12 may bear indicia printed with thermochromic ink, which is activated to change color or opacity by changes in temperature (or ink that changes upon exposure to radiation). Further, article 10 may bear (either on label 12 or within label 12 or bands 14A and 14B, a scented substance, which may, for example, serve either as an insect or animal repellant or attractant). To the extent any such indicia is surface-borne, article 10 may also bear indicia on front side 12A and/or back side 12B of label 12, and/or such indicia may also be borne by or printed on or formed from bands 14A and 14B.

FIG. 3 shows article 10 from its back side, with the bands 14A and 14B slightly stretched outwardly away from label 12 to illustrate the formation of an item-receptive loop defined therebetween (such as loop 38A between band 14A and label 12, and loop 38B between band 14B and label 12). As further shown, article 10 includes release liners 40A and 40B, which are located at least partially below bands 14A and 14B, respectively. Release liners 40A and 40B are films or coatings of one or more release agents (e.g., silicon-based release materials) configured to allow bands 14A and 14B to be removed from label 12 without undue force, thereby providing loops 38A and 38B.

In one embodiment, as shown in FIG. 3, release liners 40A and 40B do not extend across an entirety of back side 12B of label 12. For example, as shown in FIG. 3, release liners 40A and 40B have surface areas that correspond to the surface areas of spans 28A and 28B of bands 14A and 14B. In an alternative embodiment, release liners 40A and 40B may have surface areas that are greater than the surface areas of spans 28A and 28B of bands 14A and 14B, but are less than the entire surface area of back side 12B.

In one embodiment, bands 14A and 14B have combined surface areas that are less than about 50% of a surface area of label 12. In another embodiment, bands 14A and 14B have combined surface areas that are less than about 25% of the surface area of label 12. Furthermore, in else embodiment, release liners 40A and 40B have combined surface areas that are less than about 50% of the surface area of label 12. In another embodiment, release liners 40A and 40B have combined surface areas that are less than about 25% of the surface area of label 12. As used herein, the surface areas are taken in a plane that is parallel to back side 12B, and with respect to bands 14A and 14B, the surface areas are taken while bands 14A and 14B are in relaxed, non-stretched states (such as illustrated in FIG. 1). Furthermore, the terms "about" and "substantially", are used herein with respect to measurable values and ranges due to expected variations known to those skilled in the art (e.g., limitations and variabilities in measurements).

FIG. 4 illustrates loop 38A in section, relative to a lateral section taken through band 14A of article 10, along Section 4-4 in FIG. 3. Span 28A may be stretched to increase the dimensions of loop 38A, thereby allowing article 10 to be mounted around an item. For example, as shown in FIG. 5, spans 28A and 28B of bands 14A and 14B are stretched to more than four times each span's unstretched size about the back of chair 41. For the article 10 illustrated, label 12 is desirably formed of a material having sufficient integrity to prevent its deformation and stretching when bands 14A and 14B affixed thereto are so stretched, such as seen in FIG. 5.

To apply article 10 to an item such as the chair 41, spans 28A and 28B of bands 14A and 14B are pulled away from label 12, and stretched as necessary to extend around that portion of the item (e.g., chair 41) to which article 10 is being affixed. Bands 14A and 14B may then be released so that they contract back to the extent possible allowed by the item now disposed between the spans 28A and 28B, respectively, and label 12.

As can be appreciated by a comparison of FIGS. 1 and 5, when article 10 is secured to such an item, the distance from one end of each of bands 14A and 14B to its other end (as measured along the band itself) is longer when it is stretched than when article 10 is sitting loosely and unsecured. In other words, bands 14A and 14B serve as flexible securing mechanisms that extend (i.e., stretch) to accommodate the size or shape of an item to which article 10 is being affixed, and then, after release, remain extended to some extent while engaged about that item.

Web-based processing may be an economical process for the manufacture of labeling articles 10, although batch processing and conveyor processing with indexing from station to station for specific operations can be useful (especially for uniquely designed or shaped labeling articles or for the elastic sheets on such labeling articles). In web-based processing, a web of label material (which may be formed from, for example, such materials as polypropylene or polystyrene) may have a surface treatment such as the well known corona surface treatment and then the web is repetitively printed with informational matter as intended for each labeling article to later be cut from the web.

The printed label material web is then fed simultaneously with molten elastomer (e.g., a thermoplastic elastomer such as styrenic block copolymer) through the nip of chill rollers. The molten elastomer is applied to extend laterally as a layer over the web, as it is advanced, either across the full face of the web or one or more lateral segments thereof. The temperatures of the chill rollers (from about −7° C. (about 20° F.) to about 4° C. (about 40° F.)) are adjusted to cool the molten elastomer to a "frozen" state while simultaneously applying pressure by the rollers (up to about 3,400 kilopascals (about 500 psi)) to affect the formation of a layer of elastomer at the thickness desired (e.g., from about 25 micrometers (about 0.001 inches) to about 1,100 micrometers (about 0.045 inches)) and also to affect the formation of bond zones between the elastomer and the label material (such as the bond zones 24A and 26A for band 14A and bond zones 24B and 26B for band 14B, illustrated in FIGS. 1, 3, and 4).

For article 10, the bond strength between label 12 and any securing band 14 attached thereto (e.g., band 14A or 14B) is placed in tension in use (such as, for example, as seen in FIG. 5). Thus, label 12 and bands 14A and 14B are selected for compatible bonding, or a suitable adhesive is used to bond them together, as discussed above.

To prevent the entire layer of elastomer from bonding to the label material web, a release agent liner is disposed upon selected portions of the label material web prior to the deposition of the molten elastomer thereon. Such a release agent liner may be added during the label material/elastomer lamination step, or by a silicone or other nonstick surface coating applied previously, during or after a printing step of indicia on the label material web, etc. The release agent liner may also take the form of a separate layer of material disposed between the label material web and the molten elastomer. This separate layer may be a tape or other sheet material that is then later removed from between the two labeling article materials, or remains bonded to one of the materials but not the other.

When formed in a web-based processing configuration, after the elastomer has been bonded to the label material web, this laminate of elastomer/label material is then further processed to define individual labeling articles. A lateral cut may be made to separate each labeling article from the laminating web, or each labeling article may be defined by lateral perforations that are formed in the laminated web or were preformed in the labeling material web prior to lamination. Thus, the labeling articles are then later separated from the web, at a time desired, by tearing the perforations. A plurality of labeling articles may thus be provided in sheet form or in roll form for dispensing by an end user at a time and place as desired.

FIGS. 6 and 7 illustrate schematically a process for manufacturing multiple labeling articles 10. A web of label material 42 is advanced longitudinally (in direction of arrow 43) past elastomer extruder head (or heads) 44 that deposits molten elastomer 46 onto the web of label material 42.

Prior to web 42 passing the extruding station associated with extruder head 44 (i.e., upstream therefrom), one or more stripes of discrete, spaced apart segments of a release liner material have been disposed on the web of label material 42. In the process illustrated in FIG. 6, two such stripes are illustrated. One stripe is defined by a plurality of spaced apart segments 48A and a second strip is illustrated by a plurality of spaced apart segments 48B.

While the segments of each stripe may take any form (e.g., rectangular as illustrated), the release liner material is not disposed continuously in this stripe (in the machine direction such as illustrated by arrow 43), but rather intermittently (i.e., "skip-coated"). Accordingly, a release liner material gap 50A is provided between adjacent segments 48A and a release liner material gap 50B is provided between adjacent segments 48B. The gaps 50A and 50B are free of release liner material. As will be discussed below, gaps 50A and 50B are paired laterally across the face of the web 42 (on what will ultimately be the back side 12B of label 12), and are aligned relative to a web severing line (illustrated by dashed lines 52 in FIG. 6), which may bisect or otherwise divide each gap between adjacent segments.

As molten elastomer 46 is deposited onto web 42 by the extruder head 44, each segments 48A and 48B of release liner material prevents the elastomer 46 from bonding to the label material web 42. In the illustration of FIG. 6, two laterally spaced apart strips of molten elastomer 46 are deposited by extruder head 44, shown as strip 46A and strip 46B. Elastomer strip 46A is disposed along and over the stripe defined by segments 48A and gaps 50A, while elastomer strip 46B is disposed over and along the stripe defined by segments 48B and gaps 50B.

Once the elastomer has cured (i.e., solidified), the elastomer (in layer form) and web 42 are bonded together as a web assembly 53, with the bonding taking place only at gaps 50A and 50B under each strip 46A and 46B of elastomer, respectively. Thus, each portion of each strip of elastomer that extends over a band of release material is not significantly bonded to web 42, thereby allowing spans 28A and 28B of bands 14A and 14B of each article 10 to be separated from release liners 40A and 40B without undue separation forces. These portions are illustrated, for example, by unbonded elastomer strip portions 54A and 54B in FIG. 6. These unbonded elastomer strip portions 54A and 54B correspond generally to the spans 28 and 28B; respectively, illustrated in FIGS. 1 and 3.

Individual labeling articles 10 are then later separated from the web assembly 53 along the web severing lines 52, as illustrated in FIG. 7. Although severing lines 52 are indicated as linear and laterally extending across the web assembly, it is contemplated that each separation line need not be linear or laterally extending. For instance, the severing lines 52 may be defined as curved lines or serpentine lines between adjacent labeling articles 10. In addition, labeling articles of other shapes heart-shaped, circular, etc.) could be formed by die-cutting those portions of the web assembly, as discussed below.

FIG. 8 illustrates one form of an application of elastomer 46 to the label material web 42, such as by using extruder head 44 and lamination roll 60. Lamination roll 60 not only forms a layer of the elastomer 46 on top of the label material web 42, but also bonds the two materials together by nip pressure between lamination roll 60 and a backup roll 62 supporting label material web 42.

As can be appreciated, the size of each bond zone of a labeling article (e.g., bond zones 24A and 26A) is dependent in part on the size of the gap (e.g., gap 50A) disposed between adjacent segments of release liner material (e.g., segments 48A) and the location of the severing line (e.g., severing line 52) that extends through that gap. The space between adjacent gaps (i.e., the machine direction length of a segment of release liner material between adjacent gaps) in turn defines the span between the bond zones of a particular labeling article.

Labeling articles of a variety of lengths (as defined by severing lines 52 illustrated in FIGS. 6 and 7) can be formed, simply by controlling the length of the segments of release liner material (e.g., segments 48A) disposed on the web of label material (e.g., web 42), thereby establishing the spacings from one gap to the next along the web of label material. As further illustrated in FIGS. 6 and 7, labeling articles of generally the same size (as defined by the distance between adjacent severing lines 52) may be formed. This is useful when the labeling articles bear indicia such that each labeling article bears at least in part the same indicia or printed information, for print and cut registration purposes, and for registration of the elastomer span(s) formed on each labeling article. Print registration is desirably aligned during processing with the disposition of the bands of release layer material and gaps therebetween, as well as with severing lines 52 for web assembly 53, so that, as desired, each labeling article bears its indicia in the same location.

In some embodiments, the lengths of adjacent labeling articles 10 may be varied (i.e., the length as measured by the distance between adjacent severing lines 52) by making the segments of release liner material on adjacent labeling articles 10 of different lengths, with the severing lines aligned with the gaps between such segments. In other words, labeling articles of different lengths may be sequentially made from the same web in a web-based processing environment.

In one example, where the desired label article 10 is formed to be 22 centimeters by 28 centimeters (8.5 inches by 11 inches) in sheet form (with the 22 centimeter (8.5 inch) dimension being the machine direction dimension), each segment 48A and 48B of release liner material laid down is about 19 centimeters (about 7.5 inches) long and each gap 50A and 50B is about 2.5 centimeters (about 1.0 inch) long. When severing lines 52 are centered on each gap 50A and 50B, the resulting bond zone on the labeling article 10 is about 1.3 centimeters (about 0.5 inches) long, once the labeling article 10 has been cut apart from the web assembly 53. The resultant span in this instance is about 19 centimeters (about 7.5 inches) long (the same distance as the release liner segments 48A and 48B).

In this example, the width (lateral dimension) of each segment 48A and 48B of release liner material is about 3.2 centimeters (about 1.25 inches), and the width of each elastomer layer 46A and 46B is about 2.5 centimeters (about 1.0 inch). The label 12 may be formed of a polymer sheet with a nominal thickness of about 0.254 millimeters (about 0.010 inches) (within a thickness range of about 76.2 micrometers (about 0.003 inches) to about 1,000 micrometers (about 0.040 inches)), and each elastomer layer 46A and 46B as cured on the label 12 may have a thickness of about 230 micrometers (about 0.009 inches).

In formation, the molten elastomer 46 is dispensed over the strip of spaced apart segments 48A and 48B of release liner material so that elastomer 46 does not contact (and bond to) the web of label material 42 alongside (i.e., laterally to) the release liner material. In other words, the molten elastomer 46 is dispensed no wider than the release liner segments 48A and 48B (in the lateral dimension) so that it only contacts the label material web 42 at gaps 50A and 50B between adjacent segments 48A and 48B of release liner material. As shown, segments 48A and 48B, and elastomer layers 46A and 46B do not extend across an entirety of web 42 (corresponding to label 12). This results in bands 14A and 14B, and release liners 40A and 40B of each article 10 having surface areas that are less than the surface area of back side 12B of label 12. As discussed above, this increases the ease of use of bands 14A and 14B when inserting article 10 around an item.

Labeling article 10 shown in FIGS. 1-8 has two parallel bands 14A and 14B, and a rectangular label 12. As noted above, one elastomer band per labeling article may suffice, or a labeling article may have multiple bands, such as two bands, three bands, or more. For instance, a labeling article 110 is illustrated in FIGS. 9 and 10, which has one securing band 114, and where corresponding references numbers are increased by "100" from those used for article 10 (shown in FIG. 1-8). As shown in FIG. 9, article 110 has a non-rectilinear shape (in this instance, a heart shape).

FIG. 10 illustrates a web assembly 153 after lamination of a single strip 146 of elastomer onto a web of label material 142. After lamination and elastomer curing, individual labeling articles 110 are die-cut from the web assembly 153 (as illustrated by dashed separation lines 152 in the left portion of FIG. 10) which creates waste portions X, Y and Z from the web of label material 142. In this particular example, an edge waste strip may be provided along each lateral edge of the label material, so that at least waste portions X on one side are continuously bonded together and at least waste portions Y and Z on the other side are continuously bonded together. In one arrangement, side-to-side edges of adjacent labeling articles 110 are spaced apart, so that with such waste portions, all of the waste is continuously bonded together.

As discussed above, prior to lamination of the elastomer strip 146 onto the web of label material 142, a release liner material is skip coated or otherwise disposed in a stripe of spaced apart segments 148, as shown in the right portion of FIG. 10. A release liner material gap 150 is provided between adjacent segments 148. Each gap 150 is thus free of release liner material so that, when the elastomer strip 146 is laminated onto the web of label material 142, the elastomer and label material only bond together in the areas defined by gaps 150. Thus, each portion of the strip of elastomer 146 that extends over a band of release material is not bonded to the web of label material 142 (as illustrated by unbonded elastomer strip portion 154 in FIG. 10). As discussed above, elastomer strip portions 154 are desirably bonded to segments 148 to prevent elastomer strip portions 154 from prematurely delaminating from segments 148 during shipping and storage, while also allowing bands 114 (corresponding to elastomer strip portion 154) to be separated from release liners 140 (corresponding to segments 148) without undue removal forces.

After individual labeling articles 110 are separated front the web assembly 153, each band 114 is affixed to its respective label 112 at bond zones 124 and 126. The unbonded portion of band 114 (e.g., span 128) can thus move and stretch away from label 112, thereby forming a fastening loop 138, as generally illustrated above in FIG. 9.

FIG. 11 illustrates the formation of alternative labeling articles, where the entire web of label material is coated with a layer of elastomer, from lateral side to lateral side thereof. In other words, the elastomer strip is as wide as the web width. This is in comparison to bands 14A, 14B, and 114, and release liners 40A, 40B, and 140, each which has a surface area that is less than the surface area of labels 12 and 112, respectively.

Adjacent segments of release liner material on the web are also as wide as the web width, as are the gaps therebetween. In FIG. 11, a web of label material 242 is shown, on the right side of FIG. 11, with segments 248 of release liner material and gaps 250 therebetween. The left side of FIG. 11 illustrates the web 242 post-lamination of a strip of elastomer material 246 onto the web 242, which is also as wide as the web 242. Lateral separation lines 252 are also shown, extending through the lamination or bond areas at gaps 250.

In this example, however, additional machine direction separation lines 252a, 252b and 252c are shown. The separation lines 252, 252a, 252b and 252c may be, as discussed above, perforations or die-cut separations. In any event, eventually, multiple labeling articles may be formed by both lateral and longitudinal separation from the web 242. In FIG. 11, such labeling articles are illustrated as labeling article 210a, 210b, 210c, and 210d. The labeling articles 210a-210d of FIG. 11 may be similar in form and function to the elastic labeling bands described and shown in Maltas et al., U.S. Pat. No. 7,763,135. Such smaller labeling articles (i.e., labeling articles smaller than the width of the web assembly) are also possible in alternative configurations, where the elastomer extends only in a strip narrower than the width of the label, such as when the labeling article 10 of FIG. 3 is severed apart along a severing line 252x to form two separate labeling articles therefrom.

Figure 12:
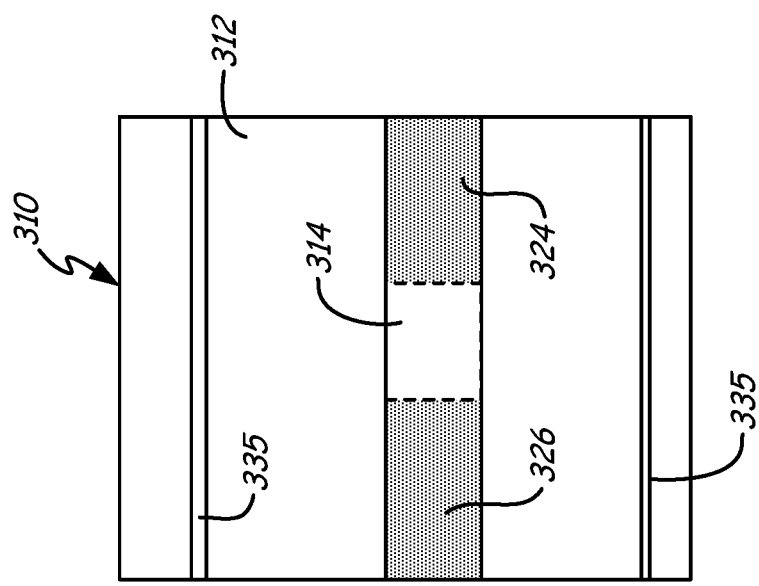
FIG. 12 is a rear view of a second alternative labeling article of the present disclosure, where the second alternative labeling article includes an elastomer band having a shorter span length.

FIGS. 12-15 show other exemplary labeling article configurations formed generally such as described above. FIG. 12 illustrates labeling article 310 having label 312, and an elastomer band 314 bonded thereto. The portion of band 314 that is not bonded to the label 312 is shorter in lateral dimension than, for example, bands 14A and 14B illustrated in FIGS. 1-8 (i.e., has a shorter span that can be stretched away from its anchoring bond zones). The space defined by a loop that is formed between the unbonded portion of the sheet 314 and the label 312 is large enough to receive and retain a post or stick inserted therethrough, thereby making labeling article 310 suitable for use as a placard or sign. Links of stiffening material 335 may be affixed to the label 312 to provide label 12 additional stiffness and prevent bowing thereof in use. Band 314 is bonded to the label 312 by bond areas 324 and 326, which as shown, may be relatively large (again as compared to bond areas 24A, 24B, 26A, and 26B, illustrated in FIGS. 1-8). The bond areas need not be as large as illustrated in FIG. 12, but are desirably large enough to sufficiently bond the band 314 to the label 312 for its intended use.

Figure 13:
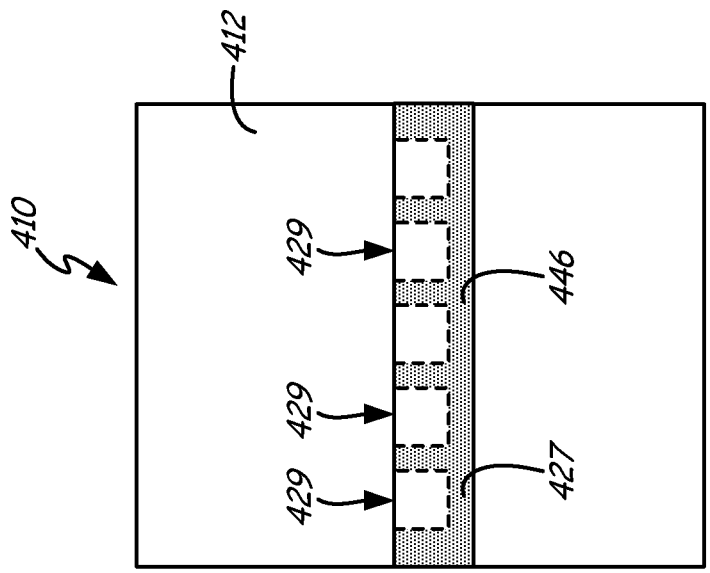
FIG. 13 is a rear view of a third alternative labeling article of the present disclosure, where the third alternative labeling article includes an elastomer band configured to provide multiple pockets.

FIG. 13 illustrates a labeling article 410 having a label 412 with a layer of elastomer 446 bonded on one side thereof. In this arrangement, a single bond zone 427 may be provided, which is continuous from side to side of the labeling article 410. One or more segments of the elastomer layer 446 may not be bonded to the label 412 along one edge of the elastomer 446, thereby forming one or more elastomer pockets 429 between the layer of elastomer 446 and the label 412. The shape of each pocket 429 is defined by the shape of the area of a band of release liner material disposed between the elastomer 446 and label 412 during or prior to lamination thereof. The shape of each pocket 429 may be defined for the purpose of holding a specific article or series of articles to the label 412. If multiple pockets 429 are provided, their shapes may be the same or may differ to allow the holding of differently shaped items.

Figure 14:
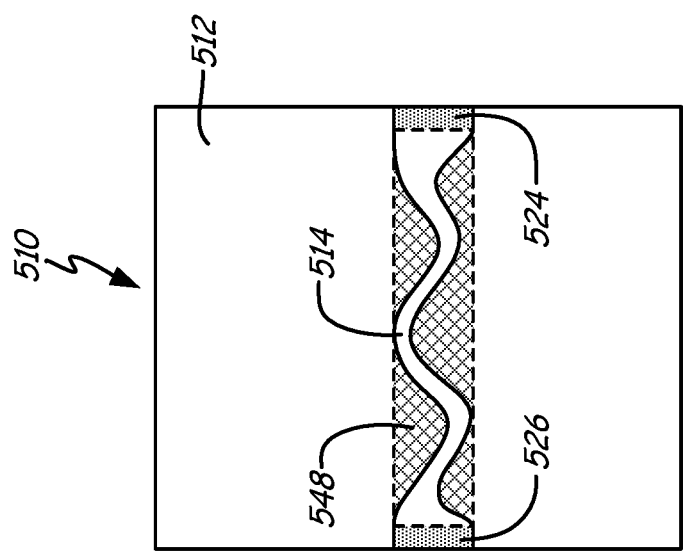
FIG. 14 is a rear view of a fourth alternative labeling article of the present disclosure, where the fourth alternative labeling article includes an elastomer band having a serpentine configuration.

FIG. 14 illustrates a labeling article 510 having a label 512 bonded to an elastomer band 514 such as at bond zones 524 and 526. In this arrangement, after the strip of elastomer material has been deposited on label 512 and cured, the unbonded portion of the band 514 may be kiss-cut by a die into a serpentine configuration (as shown in FIG. 14) or other desired configuration that joins the bond zones 524 and 526 (e.g., a Z-shaped or a switch back configuration). By narrowing the effective width of the unbonded span of the band 514 (as shown), it may be possible for that span to stretch further, thus enlarging the size of the loop that can be formed between the unbonded portion of the stretched band 514 and label 512. As also illustrated in FIG. 14, that area where a release liner material was disposed between the layer of elastomer and label 512 is illustrated as at 548.

Figure 15:
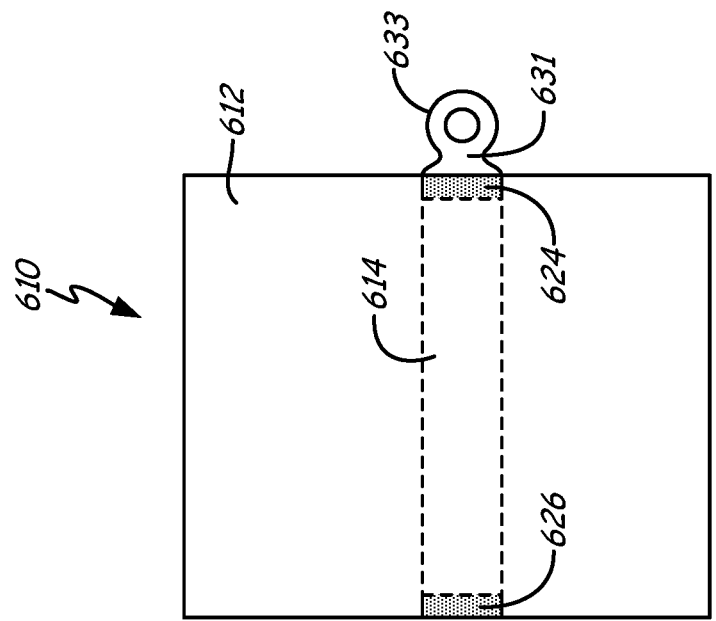
FIG. 15 is a rear view of a fifth alternative labeling article of the present disclosure, where the fifth alternative labeling article includes an elastomer band that extends outward past a bond zone to provide an elastomer loop.

FIG. 15 illustrates a labeling article 610 having a label 612 affixed to an elastomer band 614 as at bond zone 624 and 626. In this configuration, band 614 has an additional elastomer area that extends outward past the bond zone 624 (and past an edge of the label 612). The additional elastomer area, referenced at area 631 in FIG. 15, can be die-cut or kiss-cut to form a desired shape such as a tab, or (as shown) an elastomeric loop 633 or other fastener. Accordingly, once the labeling article 610 is applied to an item using the loop defined between the unbonded portion of band 614 and label 612, elastomeric loop 633 can be used to secure additional articles to the item.

It may also be possible to add additional features to the labeling article. For instance, an additional elastomeric area (like area 631 in FIG. 15) may be formed to be longitudinally extending from any portion of band 614 or may be formed to be laterally extending (as shown). In addition, other features may be added to elastomer band 614, such as one or more holes, or the addition of other shapes or imprints thereon (such as the formation of letters or numerals or other indicia (e.g., trademarks) formed on or in the elastomer sheet. Such additional elastomeric areas may take the form and/or function of unsupported elastomeric extensions illustrated in U.S. Pat. No. 6,281,345.

Label 12 itself also may be formed to have shapes imprinted thereon or holes or other shapes formed therein. Label 612 may also have an additional label area that extends past an edge of label 612. This additional label area may serve as a coupon or receipt that is separable from label 612 in use, such as along separation perforations. The additional label area may likewise not be separable but may simply form an additional part of label 612. The additional label area may also be defined as (in whole or in part) within the bounds of label 612. For example, the additional label area may be formed within label 612, and may also be separable therefrom, such as by separation perforations.

As noted above, the labeling articles of the present disclosure may be useful for attaching a label to an item to provide the user with information about that item or events nearby. For example, the labeling articles may be used for signs, produce bundling and labeling, product bundling and labeling, bio-active substances such as germ detecting substrates (e.g., *E-coli* detection), either via a coating or inherent in label or elastomer, RFID and Smart Packaging applications, totes (e.g., in order to connect several items together), chemical container labeling, a combination with an additional loop at the end of item (e.g., for additional bundling or packaging attachments), and label or elastomer in the form of a pouch (e.g., for retaining a packing list in a labeling article bound to a crate or pallet of goods).

Additional use examples include a combination with a dowel, post or stake for signage purposes, added stiffeners for signage applications, a cloth or non-woven material as the "label" (e.g., in a face mask); assembly application (in that instance, may also include a bendable tie affixed to face mask material for nose-piece formation, such tie being continuous on the material or disposed intermittently), a "living" tag or label that grows and stretches with a tree as it grows (in this instance, may also include UV protection and weathering protection features), a rodent or insect control application (in combination with a repellant or pesticide), and hunting applications (in combination with an animal attractant or masking odor material).

Further use examples are disclosed in U.S. Provisional Patent Application No. 61/265,945, the contents of which are incorporated by reference in its entirety. The features of the labeling articles disclosed herein; the methods of use thereof and the processes of formation thereof may be combined in any useful configuration.

Although the present disclosure has been described with reference to preferred embodiments, workers skilled in the art will recognize that changes may be made in form and detail without departing from the spirit and scope of the disclosure.

The invention claimed is:

1. A method for manufacturing a plurality of labeling articles, the method including:
    moving a web of a label material in a first direction;
    forming a plurality of segments of a release liner material on the moving web, wherein the segments of the release liner material are separated by gaps;
    forming a plurality of separate continuous bands of an elastic material over the plurality of segments and gaps;
    bonding each continuous band to the moving web at the gaps to form bond zones; and
    forming a plurality of lines of separation, wherein each line of separation intersects at least one of the bond zones, thereby defining the plurality of labeling articles, wherein each of the defined labeling articles extends across at least one of the plurality of segments of at least one of the plurality of formed continuous bands.

2. The method of claim 1, wherein the web includes a first major surface and a second opposing major surface, wherein the plurality of segments are formed on the first major surface, and wherein the method further includes applying indicia to the second major surface.

3. The method of claim 2, wherein applying indicia to the second major surface includes printing the indicia.

4. The method of claim 2, wherein applying indicia to the second major surface includes embedding the indicia in the web.

5. The method of claim 2 wherein the plurality of segments of the release liner material are formed as a plurality of stripes, each stripe corresponding to a respective one of the plurality of separate continuous bands of the elastic material.

6. The method of claim 5, wherein forming the plurality of stripes includes forming two stripes.

7. The method of claim 5, wherein a combined surface area of the formed plurality of stripes is less than about 50% of a surface area of the web.

8. The method of claim 5, wherein a combined surface area of the formed plurality of stripes is less than about 25% of a surface area of the web.

9. The method of claim 5, wherein forming lines of separation includes perforating the web.

10. The method of claim 5, wherein forming lines of separation includes die-cutting the web.

11. The method of claim 1, wherein bonding each continuous band to the moving web at the gaps includes using adhesive.

12. The method of claim 1, wherein forming a plurality of separate continuous bands of the elastic material includes depositing molten elastic material onto the plurality of segments and gaps.

13. The method of claim 1, wherein the web includes a first major surface and a second opposing major surface, wherein the plurality of segments are formed on the first major surface, and wherein the method further includes applying indicia to the first major surface.

14. The method of claim 13, wherein applying indicia to the first major surface includes applying the indicia to at least one of the plurality of separate continuous bands of the elastic material.

15. The method of claim 1, further including kiss-cutting the elastomer material over at least one of the plurality of segments.

16. The method of claim 1, including forming the plurality of lines of separation in a direction that is orthogonal to the first direction.

17. The method of claim 1, including forming the plurality of lines of separation in a non-linear configuration.

18. The method of claim 1, including forming the plurality of lines of separation in a curved configuration.

19. The method of claim 1, wherein forming the plurality of lines of separation defines a waste area between two adjacent labeling articles.

20. The method of claim 19, wherein a plurality of said waste areas are continuously bonded together.

* * * * *